(12) United States Patent
Scott et al.

(10) Patent No.: US 6,909,941 B2
(45) Date of Patent: Jun. 21, 2005

(54) METHODS FOR THE MANAGEMENT OF A BULK ELECTRIC POWER MARKET

(75) Inventors: Donna M. Scott, Southampton, MA (US); Katherine Gilliland, Raleigh, NC (US); Patchin Curtis, Annapolis, MD (US); Cheryl Nason, Pakenham (CA); Heather Neale, Toronto (CA); Aaron Osguthorpe, Arlington, VA (US)

(73) Assignee: ISO New England Inc., Holyoke, MA (US)

( * ) Notice: Subject to any disclaimer, the term of this patent is extended or adjusted under 35 U.S.C. 154(b) by 160 days.

(21) Appl. No.: 10/366,632

(22) Filed: Feb. 13, 2003

(65) Prior Publication Data

US 2004/0162793 A1 Aug. 19, 2004

(51) Int. Cl.[7] ............................................. G06S 19/00
(52) U.S. Cl. ........................ 700/286; 705/37; 705/412
(58) Field of Search ........................ 700/286; 705/412, 705/37

(56) References Cited

U.S. PATENT DOCUMENTS

| | | | | |
|---|---|---|---|---|
| 6,021,402 A | * | 2/2000 | Takriti | 705/412 |
| 6,115,698 A | * | 9/2000 | Tuck et al. | 705/37 |
| 6,618,709 B1 | * | 9/2003 | Sneeringer | 705/412 |
| 2003/0055664 A1 | * | 3/2003 | Suri | 705/1 |
| 2004/0010478 A1 | * | 1/2004 | Peljto et al. | 705/412 |

* cited by examiner

Primary Examiner—Leo Picard
Assistant Examiner—Alexander Kosowski
(74) Attorney, Agent, or Firm—Lipsitz & McAllister, LLC

(57) ABSTRACT

The present invention provides methods for managing a bulk electric power market. In an example embodiment of the invention, a set of inter-related process streams relating to the bulk electric power market are established. A plurality of processes for each process stream contained in the set of inter-related process streams is also established. At least one process of each process stream serves as an input to, or output from, at least one other process stream. Each process may comprise: (i) at least one of manual or automated inputs; (ii) at least one of manual or automated activities; (iii) and outputs. A diagrammatic process stream flow may be provided for each process stream. A diagrammatic process flow may be provided for each process in each process stream. Textual process descriptions may also be provided which correspond to each process flow.

33 Claims, 14 Drawing Sheets

METHODS FOR THE MANAGEMENT OF A BULK ELECTRIC POWER MARKET

BACKGROUND OF THE INVENTION

The present invention relates to the purchase and sale of electric power. More specifically, the present invention relates to the management of the bulk electric power market. In particular, the present invention provides methods for use by an Independent System Operator (ISO), a Regional Transmission Organization, or other manager of a bulk electric power market to manage the bulk electric power market for a large region.

Previously, utility companies were vertically integrated. Vertically integrated utilities are those that operate independently of one another, are not connected and serve a native load. These are the companies that generated and delivered electricity to the consumer. Vertically integrated utilities typically provide the following services: generation (the production of electricity), transmission (the transport of electricity to substations), and distribution (the delivery of electricity to homes and businesses).

In November of 1965, the northeast region of the United States incurred a substantial blackout, now commonly referred to as the Great Northeast Blackout. A great portion of the Northeast region was left without power, which affected over 30-million people. Power was out in some areas for over 13 hours.

The Great Northeast Blackout was a turning point for the electricity industry, especially in New England. After the Great Northeast Blackout, the vertically integrated utility companies began discussions about connecting to one another to ensure a more reliable electric generation and delivery system. As a result, the "power pool" concept was developed in each of New England, N.Y. and the Mid-Atlantic States. The New England Power Pool (NEPOOL) was officially organized in November of 1971.

With the organization of NEPOOL, a majority of New England investor-owned and municipal utilities formally joined together to increase reliability of electricity delivery by building a regional grid. By ending the era of the unconnected utility company, NEPOOL improved the reliability of electricity delivery and accrued savings that were passed on to the consumer. At that time New England's grid was composed of approximately 330 generating units connected by over 8,000 miles of high voltage transmission lines. No blackout has occurred on the bulk power grid since NEPOOL's inception.

In 1996, the Federal Energy Regulatory Commission (FERC) issued Orders 888 and 889 in response to the Energy Policy Act requirements and removed obstacles to competition in the wholesale trade of electricity, bringing more efficient, lower-cost electricity to customers across the country. FERC's main objective was to open the transmission systems to fair and non-discriminatory access, providing a fair transition to competitive bulk power markets while maintaining overall reliability of the system.

NEPOOL interpreted Orders 888 and 889 and proposed an independent system operator (ISO) for New England. The ISO concept was developed by the FERC as part of the framework to support the deregulation of the $200 billion electric industry in the United States. The ISO concept provides a neutral entity responsible for the management of the bulk power electricity system, a transmission reservation system known as OASIS, and a wholesale electricity marketplace. The FERC envisioned the establishment of several regional ISO's across the country, all of which would be approved and regulated by FERC. FERC stated its principles for ISO operation and governance in Order 888. These principles include: providing independent, open and fair access to the region's transmission system; establishing a non-discriminatory governance structure; facilitating market based wholesale electric rates; and ensuring the efficient management and reliable operation of the bulk power system.

The ISO concept has been implemented across the country, primarily in areas where deregulation has progressed significantly. ISO New England, established as a non-profit, nonstock corporation on Jul. 1, 1997, is one example of an implementation of the ISO concept. ISO New England, an assignee of the present invention, has responsibility for the day-to-day operation of the bulk power system in New England, administers the NEPOOL Open Access Transmission Tariff, and was pivotal in the design and development of the region's wholesale electricity marketplace.

New England's wholesale electricity marketplace includes six markets based on the physical characteristics of the bulk power grid. The markets include the energy market, as well as five other markets designed to support the reserve margin the grid is required to maintain in accordance with reliability standards set by the North American Electric Reliability Council. These reliability products are: Ten Minute Spinning Reserve, Ten Minute Non-Spinning Reserve, Thirty Minute Operating Reserve, Installed Capability, and Automatic Generation Control.

The New England Power Pool continues as a voluntary consortium of electricity companies interested in doing business in New England. Due to state-level legislation to restructure the industry, many of the vertically integrated utilities across New England were required to divest generation assets. The current membership of NEPOOL includes not only vertically integrated and municipal utilities, but also generation companies, transmission and distribution companies, power marketers, end users, and load aggregators. In order to participate in the wholesale electricity marketplace in New England, an electricity company must be a member of NEPOOL or an affiliate of a member.

It would be advantageous to provide methods for managing the bulk electric power market which are process oriented and integrate the various processes used in an efficient manner. Such a process oriented system would enable faster assimilation of data and quicker adaptation to changing market conditions and requirements. Further, such a process oriented system would enable stronger customer focus and responsiveness to customer needs. Effective communication and knowledge transfer between ISO departments would be facilitated by such process oriented methods.

The methods of the present invention provide the foregoing and other advantages.

SUMMARY OF THE INVENTION

The present invention relates to the management of a bulk electric power market. In an example embodiment of the invention, a set of inter-related process streams relating to the bulk electric power market are established. A plurality of processes for each process stream contained in the set of inter-related process streams is also established. At least one process of each process stream serves as an input to, or output from, at least one other process stream. Each process may comprise: (i) at least one of manual or automated inputs; (ii) at least one of manual or automated activities; (iii) and outputs. A diagrammatic process stream flow may be provided for each process stream. A diagrammatic process flow may be provided for each process in each process stream. Textual process descriptions may also be provided which correspond to each process flow.

The set of process streams may comprise at least some of the following process streams: (i) a market development and analysis process stream; (ii) a system models process stream; (iii) an outage scheduling process stream; (iv) an FTR/ARR auction process stream; (v) a day-ahead market process stream; (vi) a real-time market process stream; (vii) a billing services process stream; (viii) a monitor and mitigate markets process stream; (ix) a serving customers process stream; or (x) a system planning process stream.

BRIEF DESCRIPTION OF THE DRAWINGS

The present invention will hereinafter be described in conjunction with the appended drawing figures, wherein like numerals denote like elements, and.

DETAILED DESCRIPTION OF THE INVENTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 1:
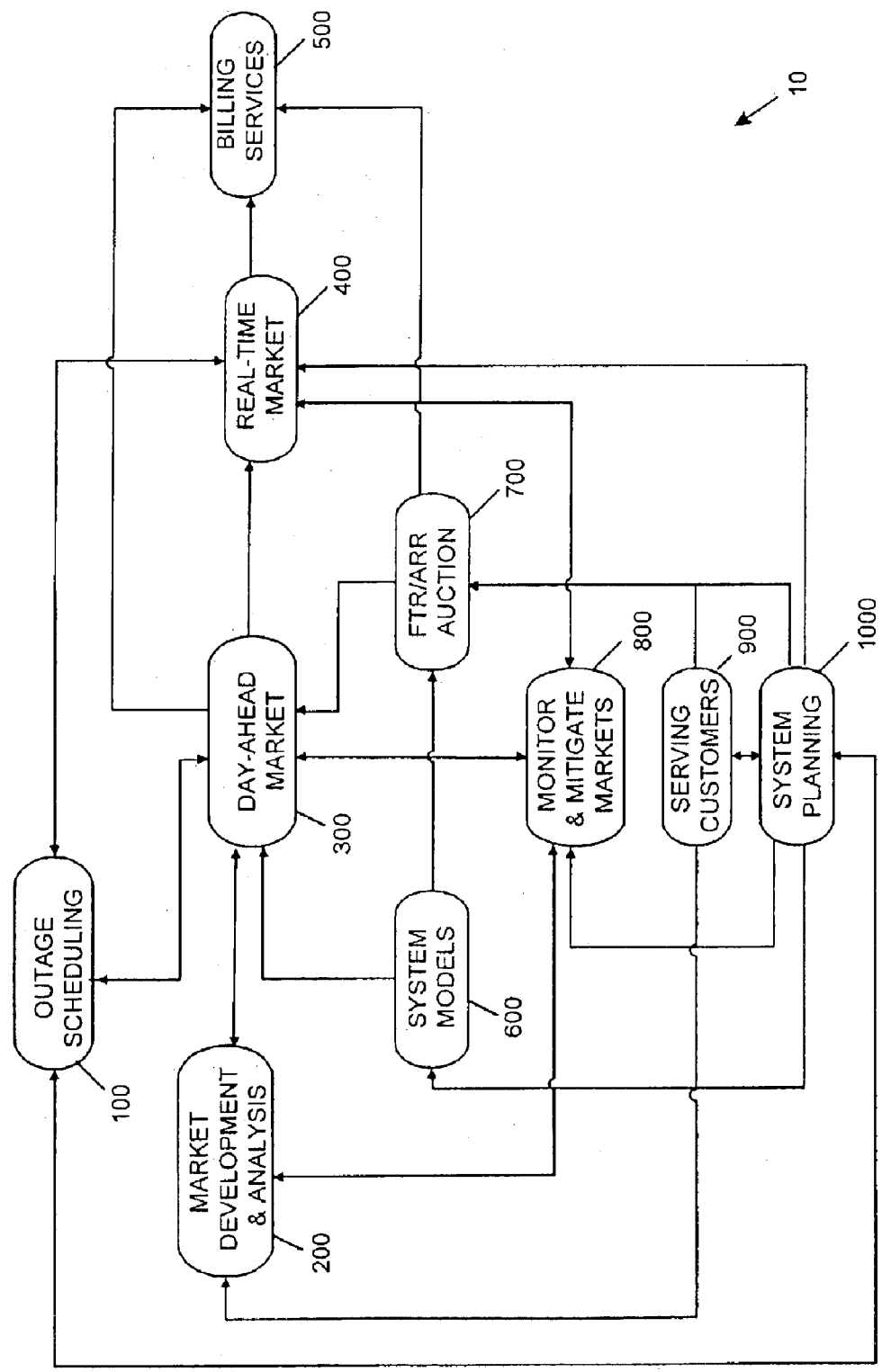
FIG. 1 shows a flow diagram of inter-related process streams in an example embodiment of the invention.
Figure 2:
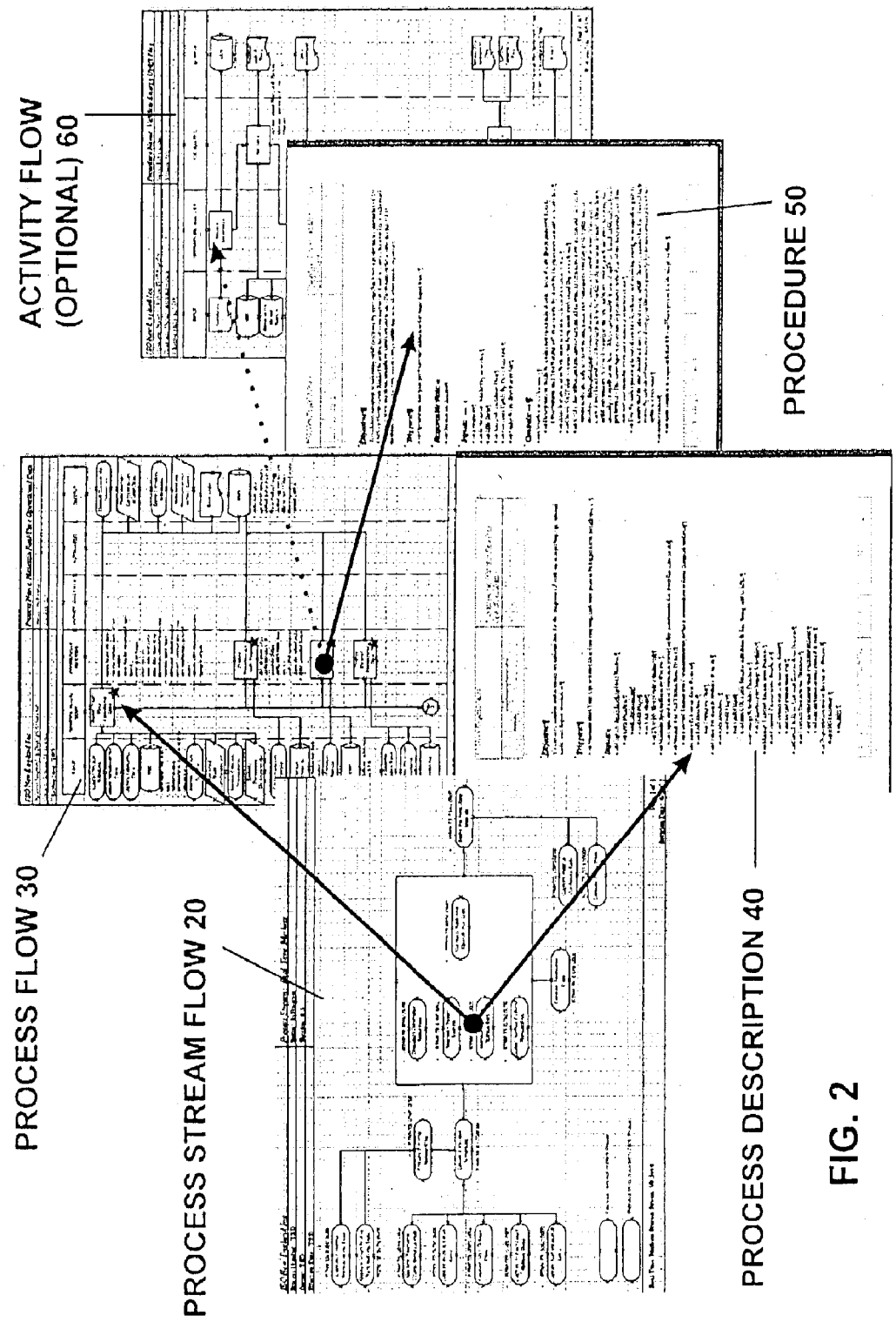
FIG. 2 shows an illustration of the inter-relationships between process streams, process flows, process descriptions, procedures, and activity flows in an example embodiment of the invention.

The present invention relates to the management of a bulk electric power market. In an example embodiment of the invention as shown in FIG. 1, a set 10 of inter-related process streams 100, 200, 300, 400, 500, 600, 700, 800, 900, and 1000 relating to the bulk electric power market are established. A plurality of processes for each process stream contained in the set 10 of inter-related process streams is also established. At least one process of each process stream serves as an input to, or output from, at least one other process stream. Each process may comprise: (i) at least one of manual or automated inputs; (ii) at least one of manual or automated activities; (iii) and outputs. As shown in FIG. 2, a diagrammatic process stream flow 20 may be provided for each process stream. A diagrammatic process flow 30 may be provided for each process in each process stream. Textual process descriptions 40 may also be provided which correspond to each process flow.

A procedure 50 for at least one manual activity of at least one process may also be provided. The procedure may comprise a textual procedural documentation for the manual activity.

As shown in FIG. 1, the set 10 of process streams may comprise at least some of the following process streams: (i) a market development and analysis process stream 200; (ii) a system models process stream 600; (iii) an outage scheduling process stream 100; (iv) an FTR/ARR auction process stream 700; (v) a day-ahead market process stream 300; (vi) a real-time market process stream 400; (vii) a billing services process stream 500; (viii) a monitor and mitigate markets process stream 800; (ix) a serving customers process stream 900; or (x) a system planning process stream 1000.

Figure 3:
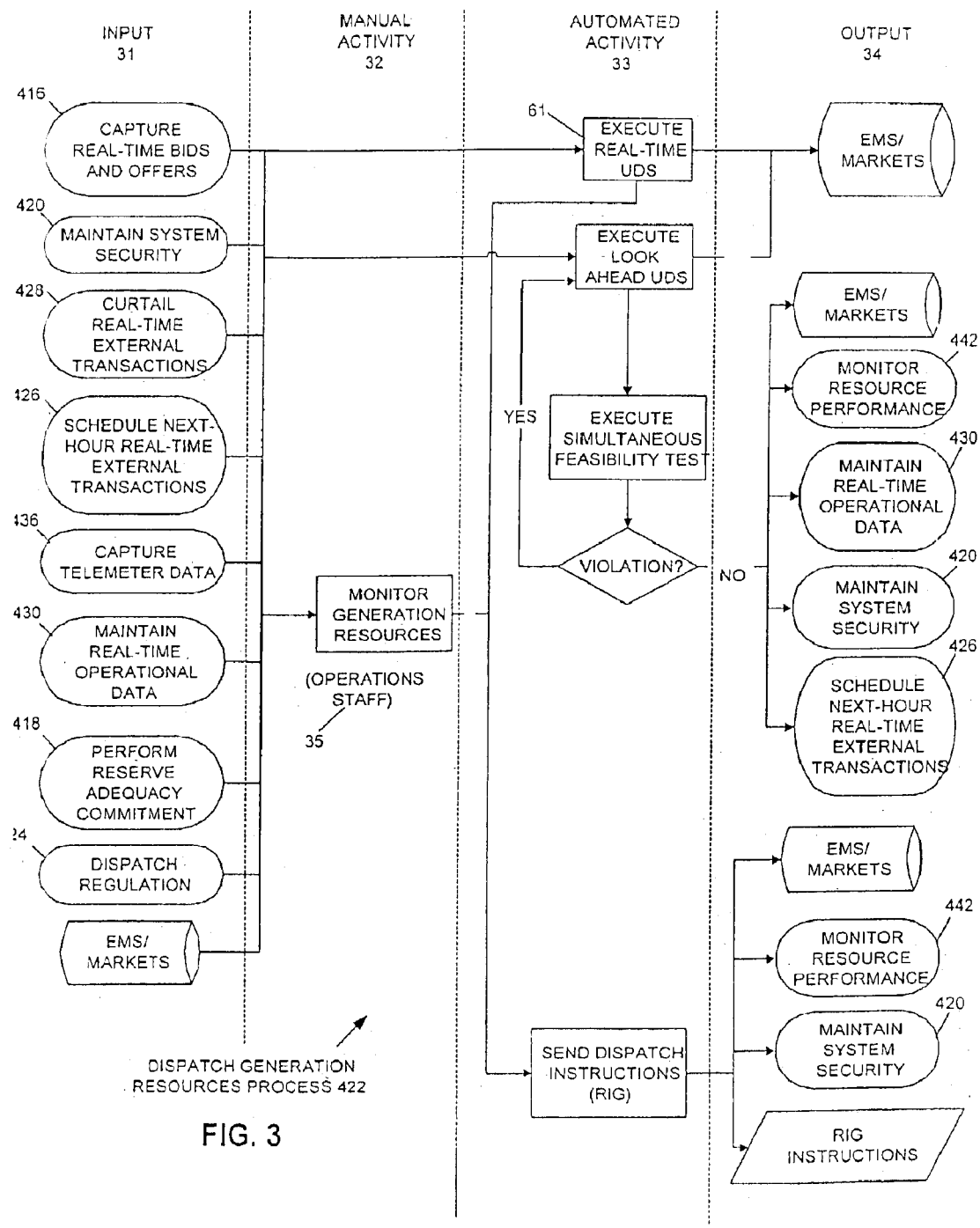
FIG. 3 shows an illustration of a process flow in accordance with an example embodiment of the invention.

An example of a diagrammatic process flow 30 (FIG. 2) is shown in FIG. 3. The diagrammatic process flow shown in FIG. 3 is the process flow for the dispatch generation resources process 422 of the real time markets process stream 400 (described in detail in connection with FIG. 7 below).

The diagrammatic process flow may provide at least one of: (i) an illustration of the relationship between inputs (column 31), activities (e.g., manual activities of column 32 and automated activities of column 33), and outputs (column 34) of the process; (ii) an illustration of any dependency of the process (in this case dispatch generation resources process 422) on other processes (e.g., such as processes 416, 420, 428, 426, 436, 430, 418, 424, and 442); (iii) an identification of the function (e.g., function 61 (execute real-time UDS) in automated activities in column 33) or department 35 (for manual activities in column 32) performing each activity of the process, or the like.

The textual process descriptions (e.g., process description 40 of FIG. 2) may provide a description of at least one of: (i) objectives of each process; triggers corresponding to each process; (ii) inputs to each process; (iii) automated and manual activities identified in each process; (iv) outputs for each process; (v) controls for each process; (vi) performance measures for each process; (vii) applications for each process; (viii) systems for each process; (ix) tools for each process; (x) related documents for each process, or the like.

The textual procedural documentation (e.g., procedure documentation 50 of FIG. 2) may include descriptions of at least one of: (i) objectives of the activity; (ii) triggers for the activity; (iii) responsible role for the activity; (iv) inputs to the activity; (v) procedural detail for the activity; (vi) outputs from the activity; (vii) controls for the activity; (viii) performance, measures for the activity; (ix) applications for the activity; (x) systems for the activity; (xi) tools for the activity; (xii) related documents for the activity, or the like.

Figure 4:
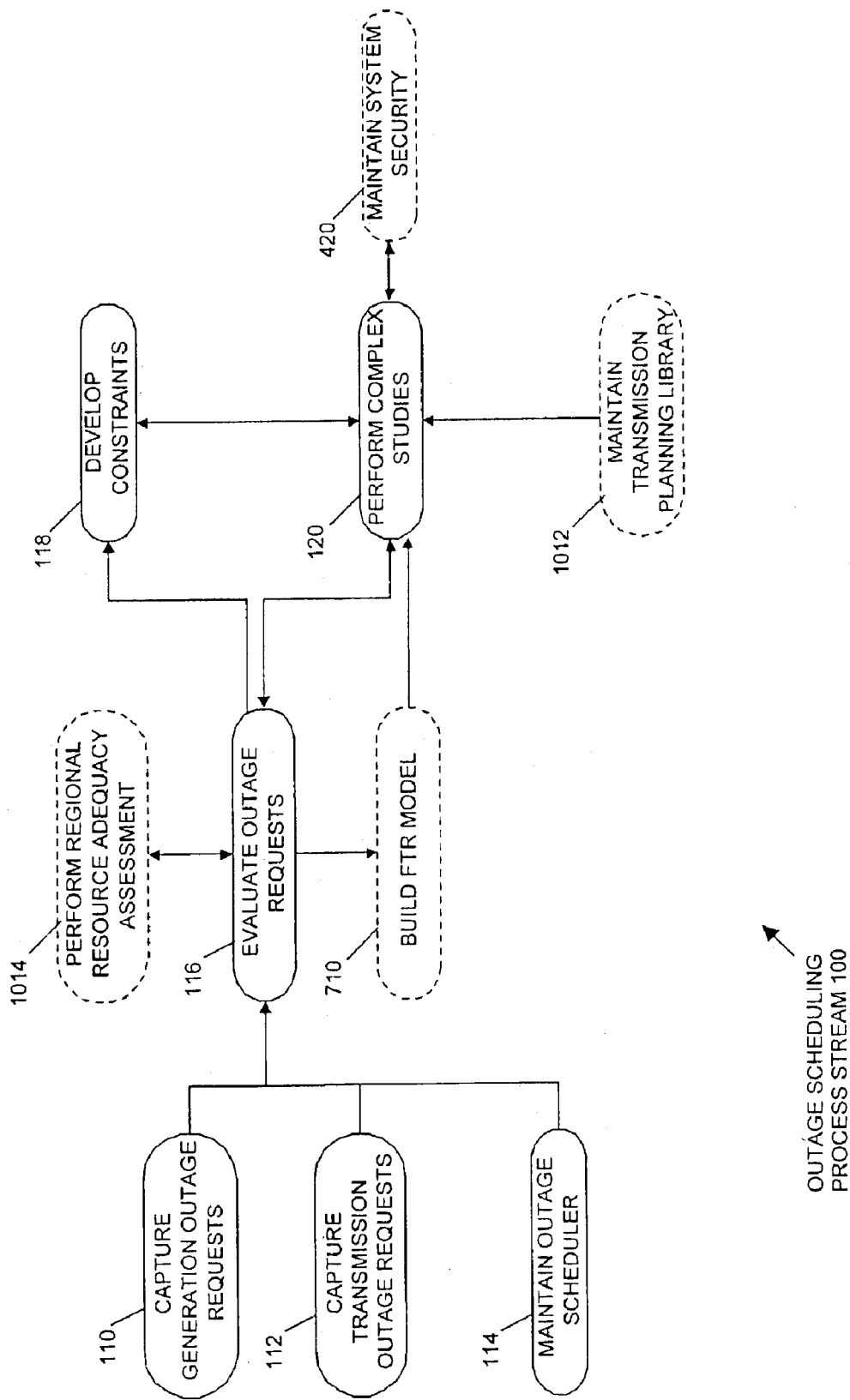
FIG. 4 shows an example embodiment of an outage scheduling process stream in accordance with the invention.

FIGS. 4–13 illustrate example embodiments of a process stream flow 20 for each process stream 100–1000. It should be appreciated that the processes shown in each process stream 100–1000 are identified by reference numbers associated with that process stream. For example, FIG. 4 shows an example embodiment of an outage scheduling process stream 100. The processes comprising the outage scheduling process stream 100 are identified by reference numerals in the 100's (i.e. 110, 112, 114, 116, 118, and 120). The processes from other process streams which serve as an input to or output from the outage scheduling process stream 100 are shown in dashed lines and are identified by reference numerals associated with those other process streams. For example, in FIG. 4, process 420 is shown in dashed lines and is part of real time markets process stream 400, and process 710, shown in dashed lines, is part of FTR/ARR auction process stream 700.

As shown in FIG. 4, the outage scheduling process stream 100 may comprise processes that capture and maintain generation and transmission outage information. Outage information is a key component of power system information, and is used to determine availability when dispatching units. In addition to capturing the outage information, this process stream 100 also includes activities to evaluate outage requests and develop constraints that are used in the day-ahead and real-time markets process streams.

As can be seen from FIG. 4, the processes that capture and maintain generation and transmission outage information may include at least some of: a capture generation outage requests process 110, a capture transmission outage requests process 112, a maintain outage scheduler process 114, an evaluate outage requests process 116, a develop constraints process 118, or a perform complex studies process 120. At least one of a perform regional resource adequacy assessment process 1014, a build FTR model process 710, a maintain transmission planning library process 1012, or a maintain system security process 420 may serve as at least one of an input to or an output from at least one corresponding process of the outage scheduling process stream 100.

Figure 5:
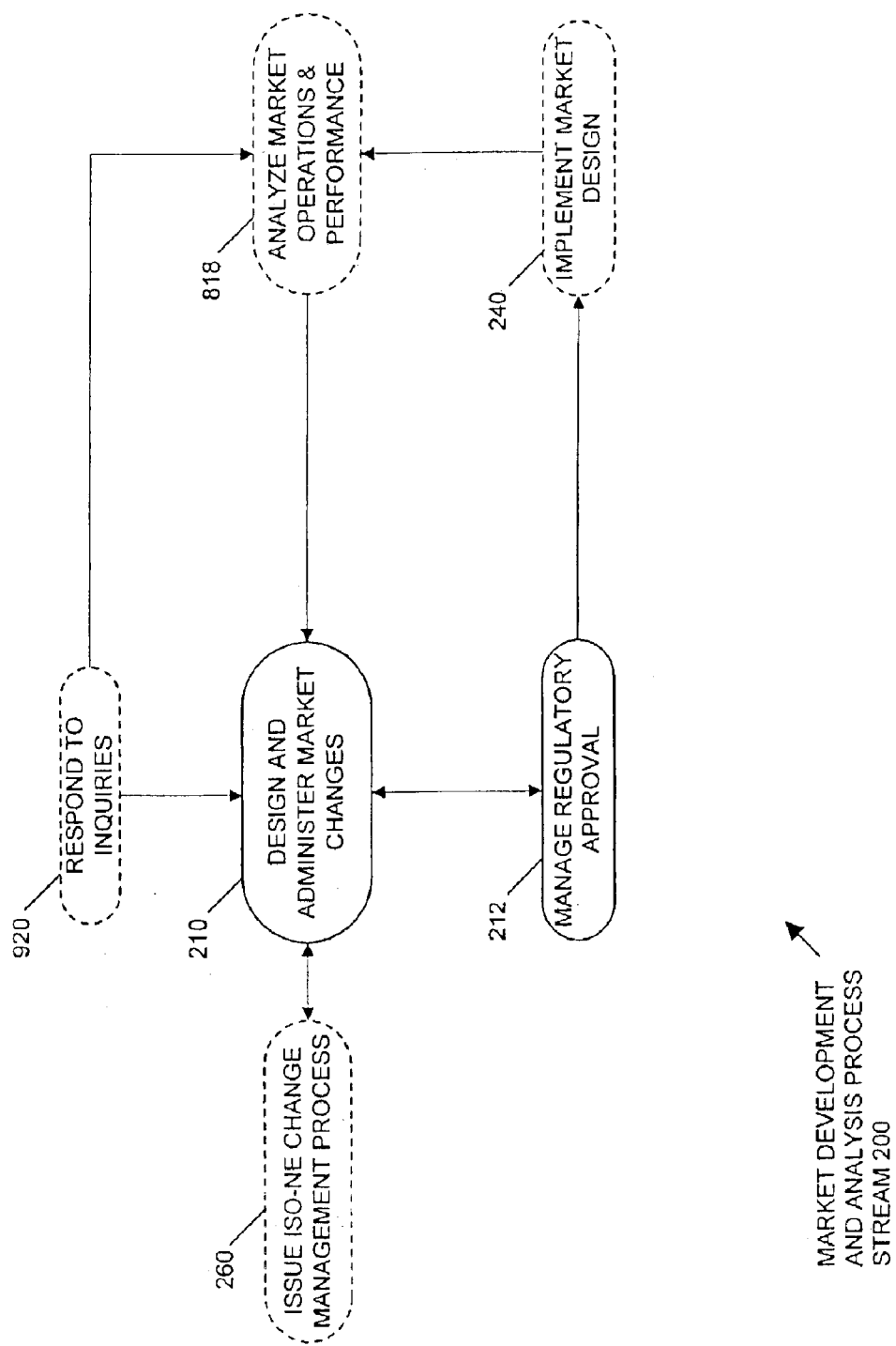
FIG. 5 shows an example embodiment of a market development and analysis process stream in accordance with the invention.

FIG. 5 shows an example embodiment of a market development and analysis process stream 200. The market development and analysis process stream 200 may comprise processes that describe how to undertake changes to a market design. This process stream 200 includes a process that describes the steps taken when notification (from any number of sources, including NEPOOL Participants, regulators, ISO-NE emergency filings, or any new conceptual input) triggers new market design analysis. The market development and analysis process stream 200 also includes a process showing how to manage regulatory approvals for new market designs as well as other types of filings. It is included as a separate process stream because of the unique and complicated nature of the tasks. New markets and regulatory approval involve large numbers of stakeholders, with a fairly well-defined sequence of events.

As shown in FIG. 5, the processes that describe how to undertake changes to a market design may include at least one of: a design and administer market changes process 210, or a manage regulatory approval process 212. At least one of an issue change management process 260, a respond to inquiries process 920, an analyze market operations and performance process 818, or an implement market design process 240 may serve as at least one of an input to or an output from at least one corresponding process of the market development and analysis process stream 200. In FIG. 5, the issue change notice process 260 and the implement market design process 240 are not market facing processes and are therefore not included within any of the other process streams.

Figure 6:
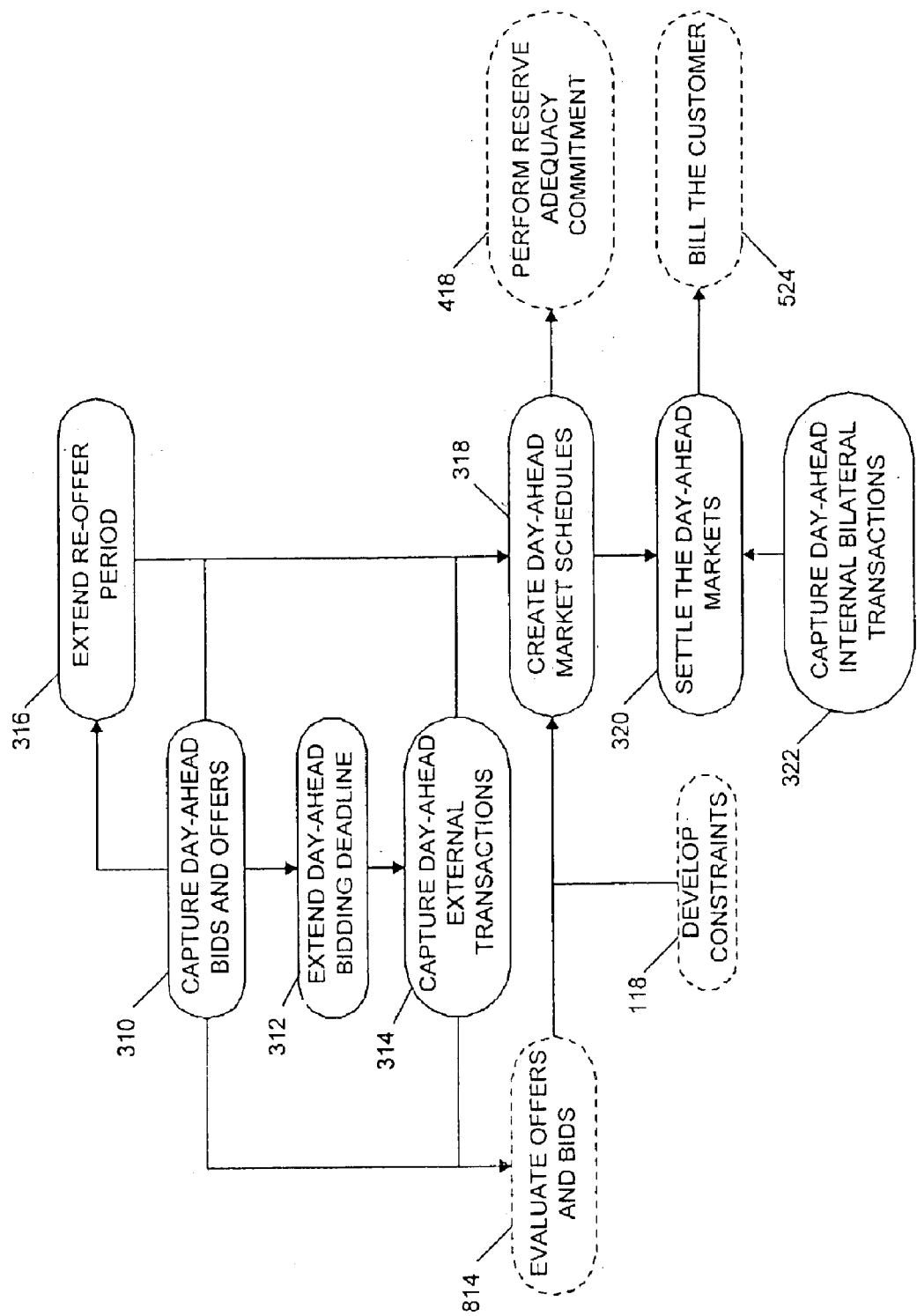
FIG. 6 shows an example embodiment of a day-ahead markets process stream in accordance with the invention.

FIG. 6 shows an example embodiment of a day-ahead markets process stream 300. The day-ahead market process stream 300 may comprise daily processes that lead to the settlement of the day-ahead market. This process stream 300 includes activities beginning with the capturing of day-ahead bids and offers as well as day-ahead external transactions. This data is used to create a day-ahead market schedule, including the calculation of day-ahead Locational Marginal Prices (LMPs) and the creation of financially binding transactions. The settle the day-ahead markets 320 then calculates the monetary positions for the customers involved in the market.

As shown in FIG. 6, the processes that lead to the settlement of the day-ahead market may include at least some of: a capture day-ahead bids and offers process 310, an extend day-ahead bidding deadline process 312, a capture day-ahead external transactions process 314, an extend re-offer period process 316, a create day-ahead market schedules process 318, a settle day-ahead markets process 320, or a capture day-ahead internal bilateral transactions process 322. At least one of an evaluate offers and bids process 814, a develop constraints process 118, a perform reserve adequacy commitment process 418, or a bill the customer process 524 may serve as at least one of an input to or an output from at least one corresponding process of the day-ahead market process stream 300.

Figure 7:
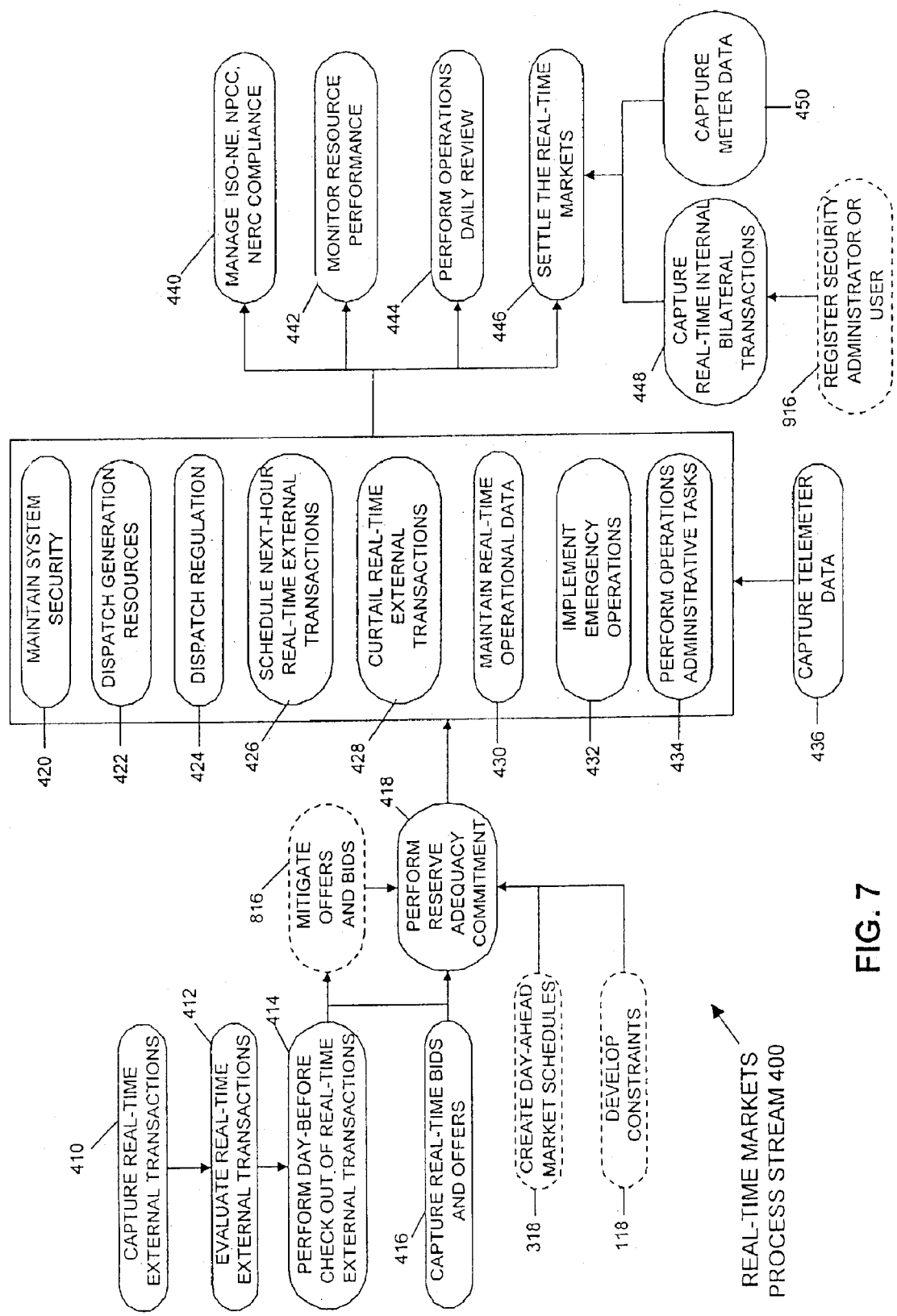
FIG. 7 shows an example embodiment of a real-time markets process stream in accordance with the invention.

FIG. 7 shows an example embodiment of a real-time markets process stream 400. The real-time market process stream 400 may comprise daily and minute-to-minute processes that lead to settling of real-time markets. The real-time market process stream 400 includes activities beginning with the capturing of real-time bids and offers as well as real-time external transactions. This process stream 400 also includes minute-to-minute iterative processes including the maintaining of system security, dispatching of generation and regulation resources, scheduling of next-hour real-time external transactions, maintaining of real-time data and implementing of emergency operations if needed. The settle the real-time markets process 446 then calculates the monetary positions for the customers involved in the market. Other tasks are included in this process stream such as the monitoring of resource performance and daily operations review and reporting.

As shown in FIG. 7, the daily and minute-to-minute processes that lead to settling of real-time markets may include at least some of: a capture real-time external transactions process 410, an evaluate real-time external transactions process 412, a perform day-before check out of real-time external transactions process 414, a capture real-time bids and offers process 416, a perform reserve adequacy commitment process 418, a maintain system security process 420, a dispatch generation resources process 422, a dispatch regulation process 424, a schedule next-hour real-time external transactions process 426, a curtail real-time external transactions process 428, a maintain real-time operational data process 430, an implement emergency operations process 432, a perform operations administrative tasks process 434, a capture telemeter data process 436, a manage compliance process 440, a monitor resource performance process 442, a perform operations daily review process 444, a settle real-time markets process 446, a capture real-time internal bilateral transactions process 448, or a capture meter data process 450. At least one of a mitigate offers and bids process 816, a create day-ahead market schedules process 318, a develop constraints process 118, or a register security administrator or user process 916 may serve as at least one of an input to or an output from at least one corresponding process of the real-time market process stream 400.

Figure 8:
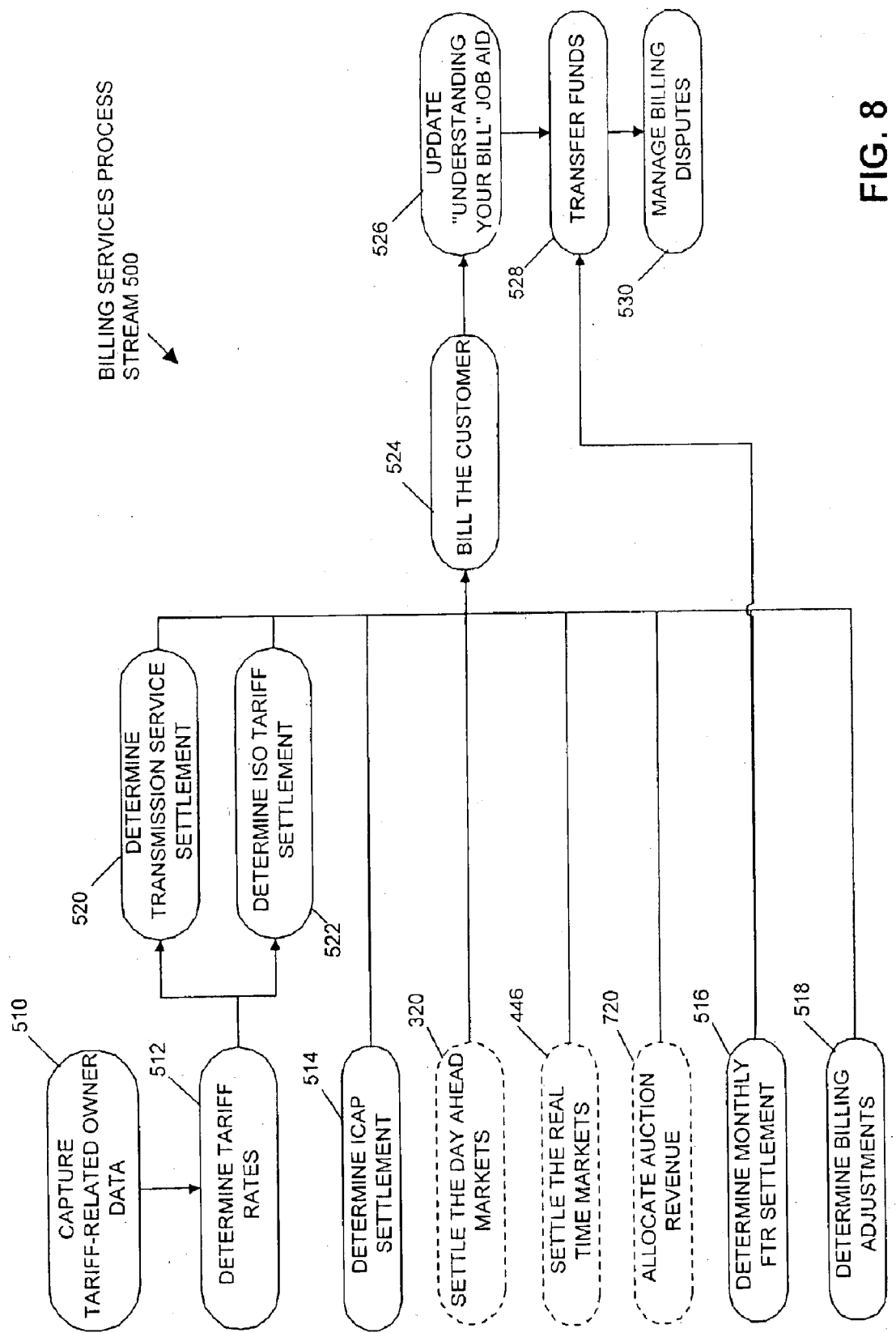
FIG. 8 shows an example embodiment of a billing services process stream in accordance with the invention.

FIG. 8 shows an example embodiment of a billing services process stream 500. The billing services process stream 500 may comprise processes occurring on a monthly basis to prepare and issue bills to customers. The billing services process stream 500 includes processes which occur after all daily settlements have been completed for a given month. It includes transmission service and ISO tariff preparation and settlement, installed capacity (ICAP) and financial transmission rights (FTR) settlements. This process stream also includes the steps necessary to analyze cash reserve requirements and transfer the funds after the bills have been issued, as well as the process used to analyze customer requests for billing adjustments.

As shown in FIG. 8, the processes occurring on a monthly basis to prepare and issue bills to customers may include at least some of: a capture tariff-related owner data process 510, a determine tariff rates process 512, a determine transmission service settlement process 520, a determine ISO tariff settlement process 522, a determine ICAP settlement process 514, a determine monthly FTR settlement process 516, a determine billing adjustments process 518, a bill customer process 524, an update "understanding your bill" job aid process 526, a transfer funds process 528, or a manage billing disputes process 530. At least one of a settle the day-ahead markets process 320, a settle the real-time markets process 446, or an allocate auction revenue process 720 may serve as at least one of an input to or an output from at least one corresponding process of the billing services process stream 500.

Figure 9:
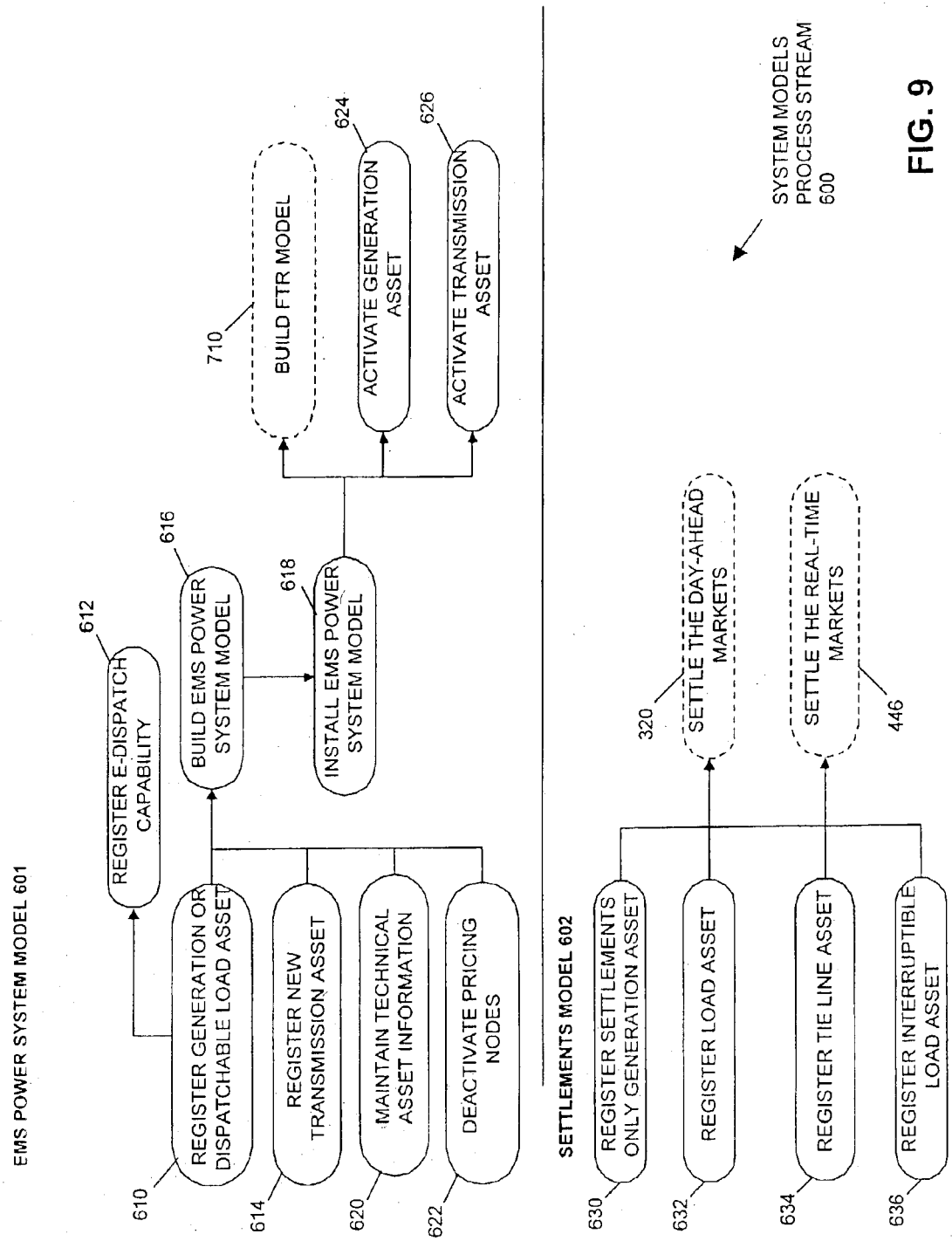
FIG. 9 shows an example embodiment of a system models process stream in accordance with the invention.

FIG. 9 shows an example embodiment of a system models process stream 600. The system model process stream 600 may include an EMS power system model 601 and a settlements model 602. The system model process stream 600 may comprise processes that build and maintain various power system models that form a foundation for other process streams. These processes describe how the different types of assets (generation, dispatchable load, transmission, technical asset, tie line, and the like) are added to, or removed from, the power system model and the processes by which they are implemented into the system.

As shown in FIG. 9, the processes that build and maintain the various power system models may include at least some of: a register generation or dispatchable load asset process 610, a register e-dispatch capability process 612, a register new transmission asset process 614, a maintain technical asset information process 620, a deactivate pricing nodes process 622, a build EMS power system model process 616, an install EMS power system model process 618, an activate generation asset process 624, an activate transmission asset process 626, a register settlements only generation asset process 630, a register load asset process 632, a register tie line asset process 634, or a register interruptible load asset process 636. At least one of a build FTR model process 710, a settle the day-ahead markets process 320, or a settle the real-time markets process 446 may serve as at least one of an input to or an output from at least one corresponding process of the system model process stream 600.

Figure 10:
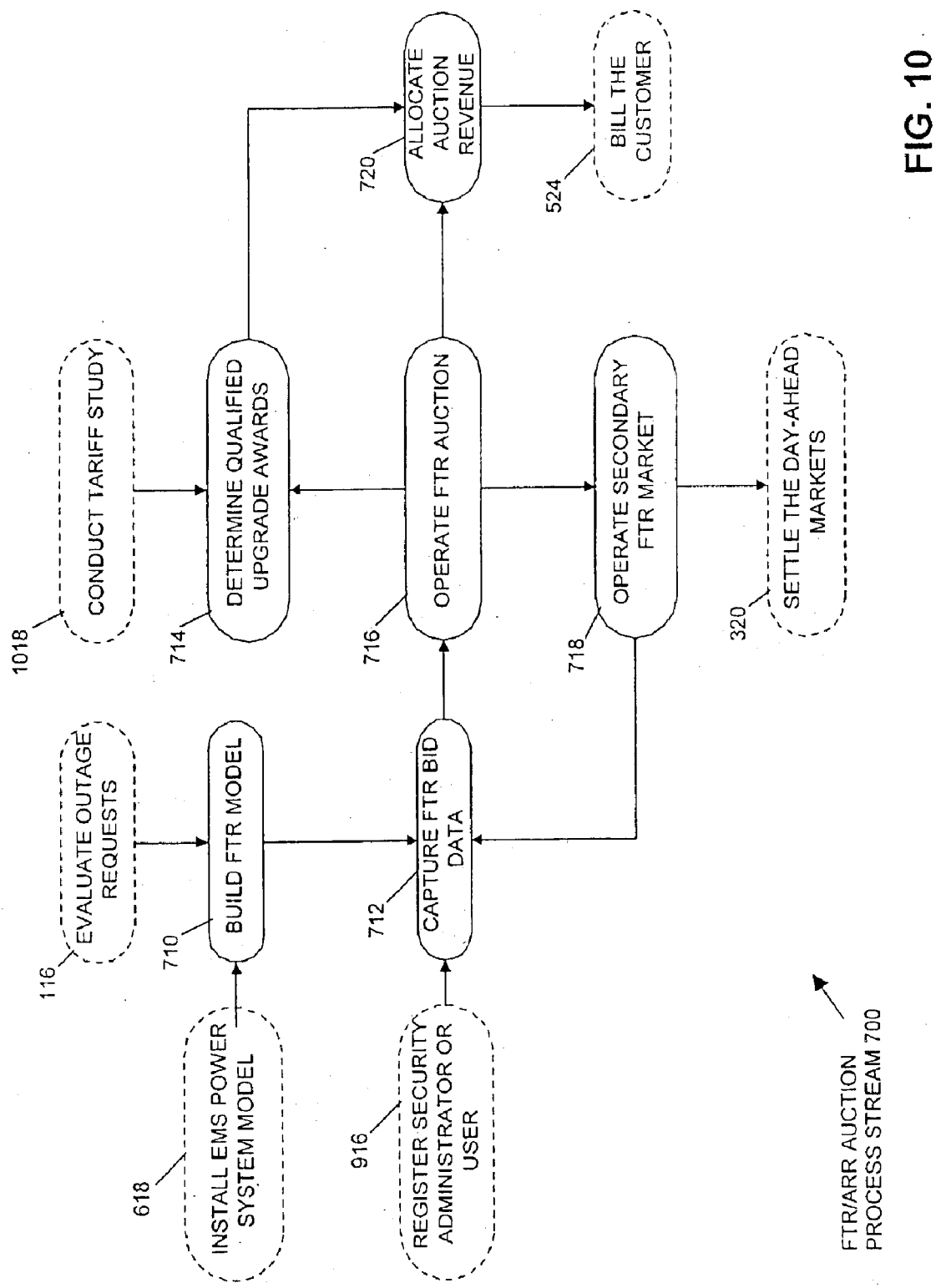
FIG. 10 shows an example embodiment of an FTR/ARR auction process stream in accordance with the invention.

FIG. 10 shows an example embodiment of an FTR/ARR auction process stream 700. The FTR/ARR auction process stream 700 may comprise processes that accomplish the FTR auction and allocation of the auction revenues. This process stream 700 includes activities to provide a proper model representative of the defined FTR auction period, capture and validate FTR bid data and operate the FTR auction to ensure an appropriate outcome. It also includes a process for operating the secondary FTR market, which provides the ability for FTR holders to register secondary trades. Further, additional processes allocate the FTR auction revenues to eligible entities with recognition of certain transmission upgrades that allow additional FTRs to be auctioned.

As shown in FIG. 10, the processes that accomplish the FTR auction and allocation of the auction revenues may include at least some of: a build FTR model process 710, a capture FTR bid data process 712, a determine qualified upgrade awards process 714, an operate FTR auction process 716, an operate secondary FTR market process 718, or an allocate auction revenue process 720. At least one of an install EMS power system model process 618, a register security administrator or user process 916, an evaluate outage requests process 116, a conduct tariff study process 1018, a settle the day-ahead markets process 320, or a bill the customer process 524 may serve as at least one of an input to or an output from at least one corresponding process of the FTR/ARR auction process stream 700.

Figure 11:
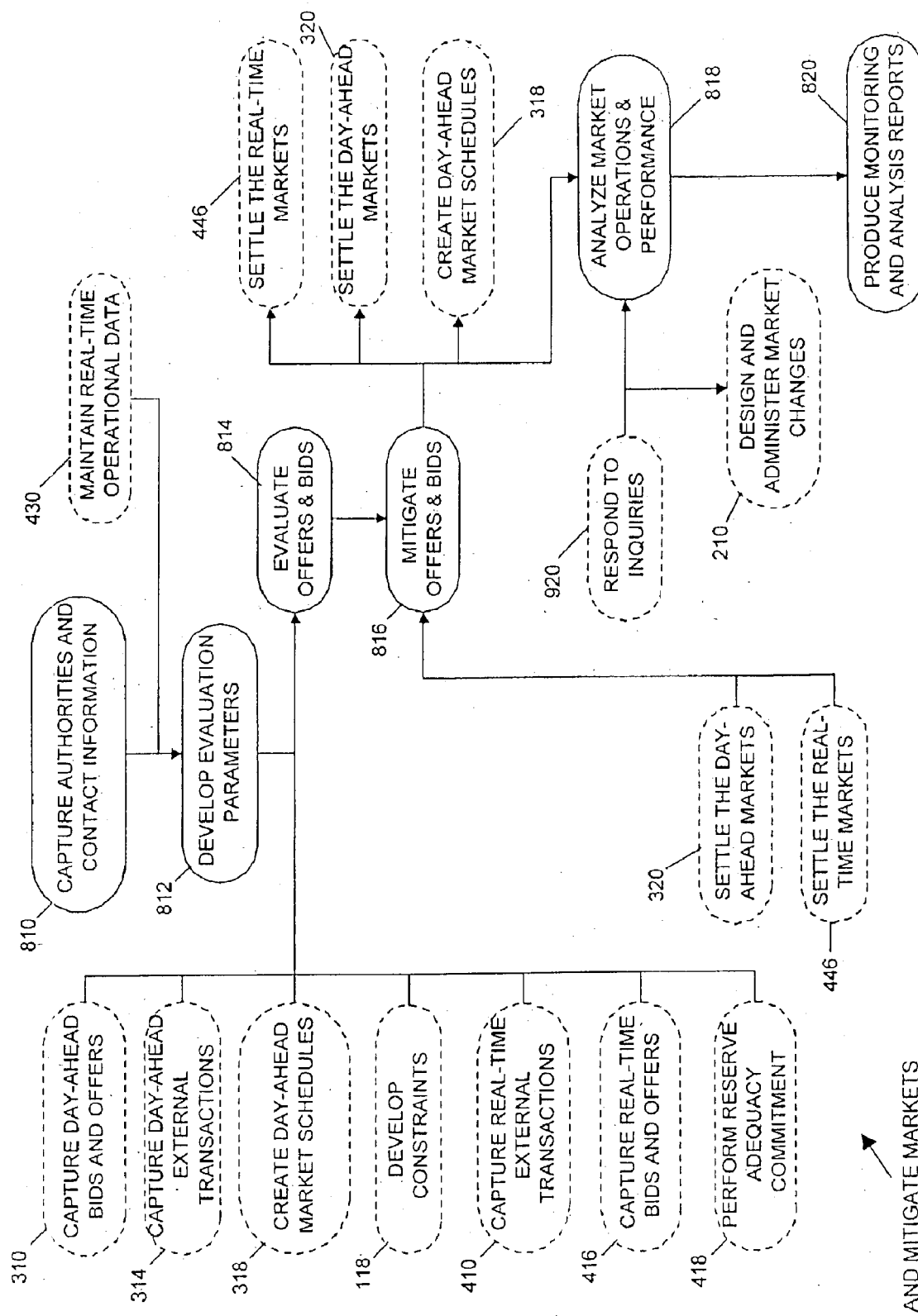
FIG. 11 shows an example embodiment of a monitor and mitigate markets process stream in accordance with the invention.

FIG. 11 shows an example embodiment of a monitor and mitigate markets process stream 800. The monitor and mitigate markets process stream 800 may comprise processes that monitor market activity and mitigate market effects that would distort competitive outcomes. This process stream 800 includes activities describing both the development of evaluation parameters for the various bid and offer data, and the evaluation and mitigation of bids and offers as necessary. This process stream 800 also includes activities to verify that market operations and performance are proper and efficient through ongoing analyses and reporting.

As shown in FIG. 11, the processes that monitor market activity and mitigate market effects that would distort competitive outcomes may include at least some of: a capture authorities and contact information process 810, a develop evaluation parameters process 812, an evaluate offers and bids process 814, a mitigate offers and bids process 816, an analyze market operations and performance process 818, or a produce monitoring and analysis reports process 820. At least one of a capture day-ahead bids and offers process 310, a capture day-ahead external transactions process 314, a create day-ahead market schedules process 318, a develop constraints process 118, a capture real-time external transactions process 410, a capture real-time bids and offers process 416, a perform reserve adequacy commitment process 418, a maintain real-time operational data process 430, a settle the day-ahead markets process 320, a settle the real-time markets process 446, a respond to inquiries process 920, or a design and administer market changes process 210 may serve as at least one of an input to or an output from at least one corresponding process of the monitor and mitigate markets process stream 800.

Figure 12:
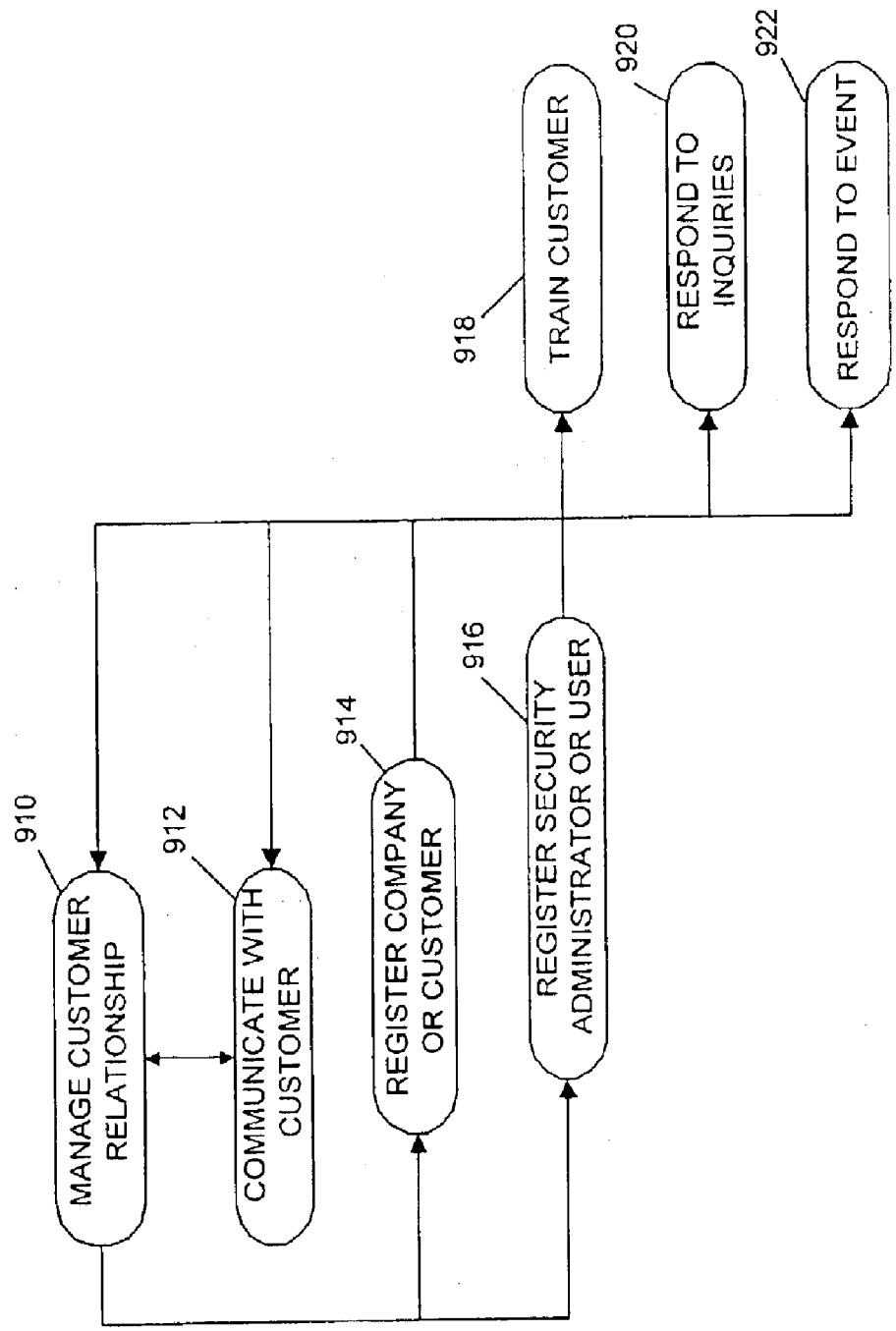
FIG. 12 shows an example embodiment of a serving customers process stream in accordance with the invention.

FIG. 12 shows an example embodiment of a serving customers process stream 900. The serving customers process stream 900 may comprise continuous processes relating to customer service activities. This process stream 900 is focused on maintaining customer satisfaction. As shown in FIG. 12, the continuous processes relating to customer service activities may include at least some of: a manage customer relationship process 910, a communicate with customer process 912, a register company or customer process 914, a register security administrator or user process 916, a train customer process 918, a respond to inquiries process 920, and a respond to event process 922.

Figure 13:
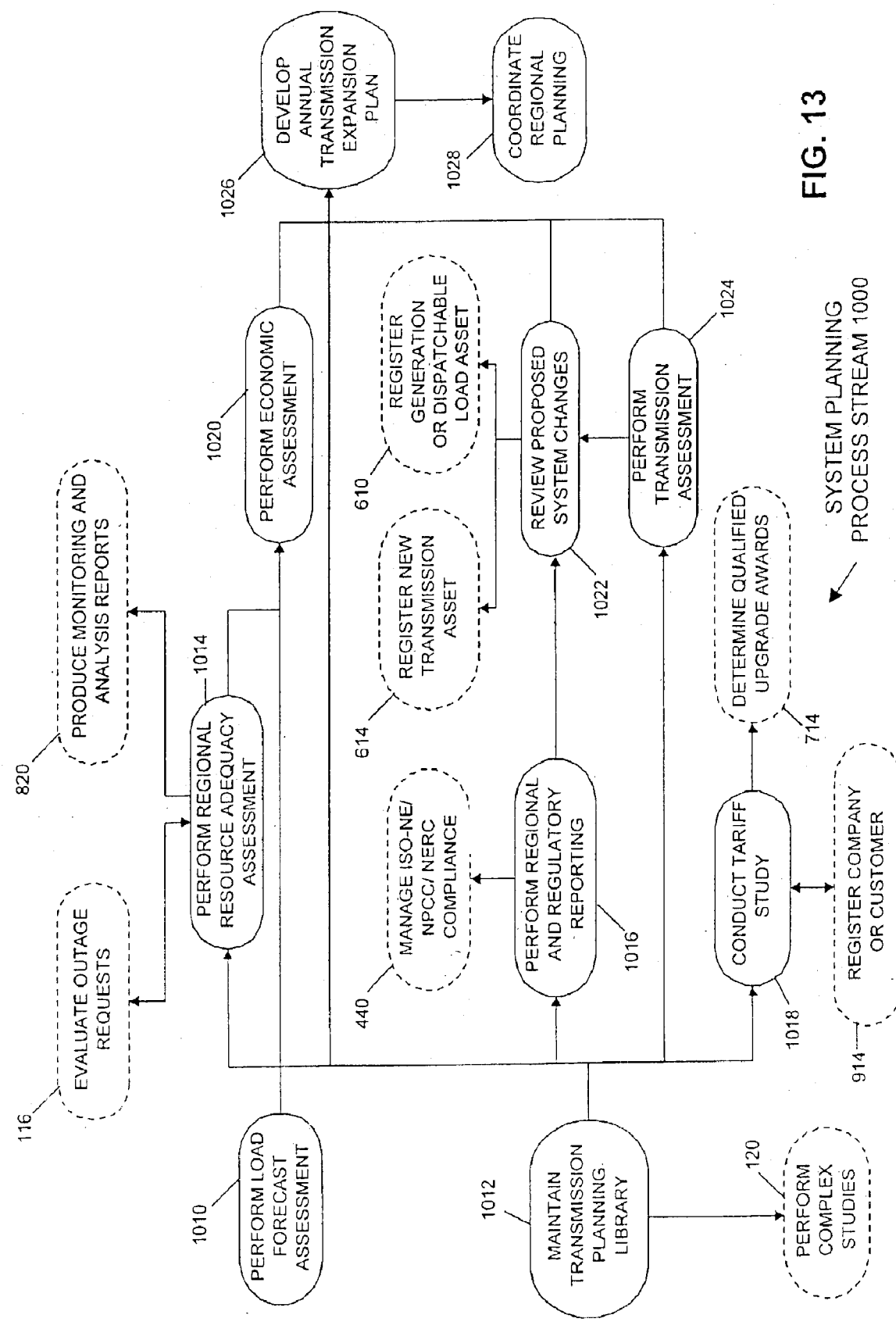
FIG. 13 shows an example embodiment of a system planning process stream in accordance with the invention.

FIG. 13 shows an example embodiment of a system planning process stream 1000. The system planning process stream 1000 may comprise processes relating to load forecasting and analysis, power supply and reliability, and transmission planning. The processes of the system planning process stream 1000 usually produce specific outputs, as is suggested by the process names, and can occur at varying times from ad hoc to annual or longer.

As shown in FIG. 13, the processes relating to load forecasting and analysis, power supply and reliability, and transmission planning may include at least some of: a perform load forecast assessment process 1010, a maintain transmission planning library process 1012, a perform regional resource adequacy assessment process 1014, a perform economic assessment process 1020, a perform regional and regulatory reporting process 1016, a review proposed system changes process 1022, a perform transmission assessment process 1024, a conduct tariff study process 1018, a develop annual transmission expansion plan process 1026, or a coordinate regional planning process 1028. At least one of an evaluate outage requests process 116, a produce monitoring and analysis reports process 820, a manage compliance process 440, a register new transmission asset process 614, a register generation or dispatchable load asset process 610, a perform complex studies process 120, a register company or customer process 914, or a determine qualified upgrade awards process 714 may serve as at least one of an input to or an output from at least one corresponding process of the system planning process stream 1000.

Figure 14:
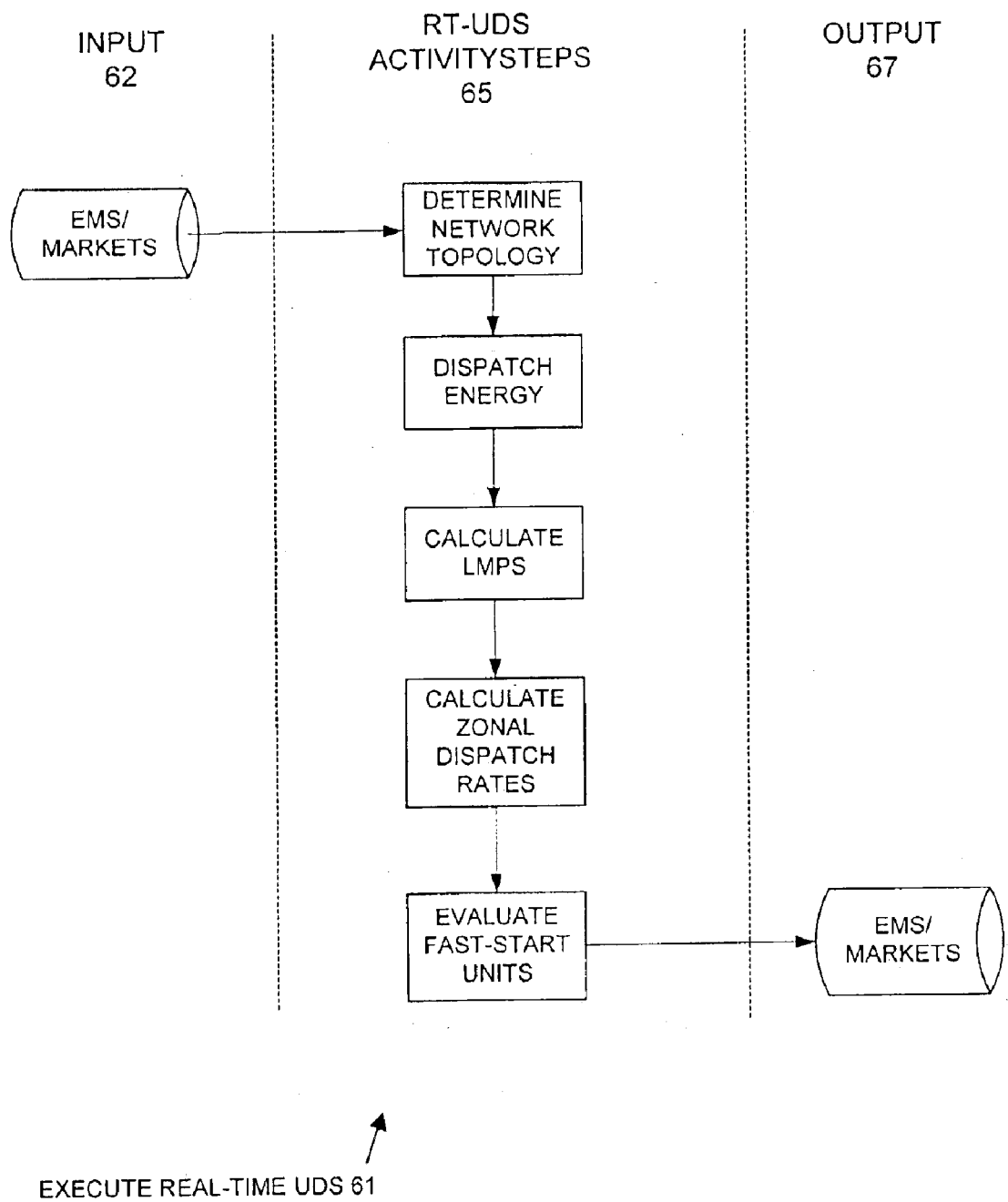
FIG. 14 shows an illustration of an activity flow in accordance with an example embodiment of the invention.

A diagrammatic activity flow 60 (FIG. 2) may optionally be provided for at least one activity in at least one of the plurality of processes. An example of a diagrammatic activity flow 60 is shown in FIG. 14. The diagrammatic activity flow shown in FIG. 14 is for an "execute real-time unit dispatch system" activity (RT-UDS 61 of the dispatch generation resources process 422 shown in automated activity column 33 of FIG. 3).

As shown in FIG. 14, the diagrammatic activity flow 61 may provide at least one of: (i) an illustration of steps of an activity (shown in RT-UDS activity steps column 65); (ii) an illustration of the relationship between inputs (column 62) and outputs (column 67) of the activity 61; or (iii) an identification of the function or department performing each task of the activity 61.

It should now be appreciated that the present invention provides advantageous methods for the management of the bulk electric power market.

Although the invention has been described in connection with various illustrated embodiments, numerous modifications and adaptations may be made thereto without departing from the spirit and scope of the invention as set forth in the claims.

What is claimed is:

1. An automated method for the management of a bulk electric power market, comprising:
   implementing a set of inter-related automated process streams relating to the bulk electric power market;
   implementing a plurality of automated processes for each process stream contained in said set of inter-related process streams, at least one process of each process stream serving as an input to, or output from, at least one other process stream, each process having: (i) automated inputs; (ii) automated activities; (iii) and automated outputs;
   implementing an automated process stream flow for each process stream;
   implementing an automated process flow for each process in each process stream; and
   utilizing the process streams to automatically manage a bulk electric power market, including at least one of: determining market-based wholesale electric rates; scheduling transmission outages; creating a day-ahead market schedule; and calculating monetary positions of customers involved in settlement of the day-ahead market.

2. A method in accordance with claim 1, wherein said set of automated process streams comprises at least some of: (i) a market development and analysis process stream; (ii) a system models process stream; (iii) an outage scheduling process stream; (iv) a Financial Transmission Rights/Auction Revenue Rights (FTR/ARR) auction process stream; (v) a day-ahead market process stream; (vi) a real-time market process stream; (vii) a billing services process stream; (viii) a monitor and mitigate markets process stream; (ix) a serving customers process stream; or (x) a system planning process stream.

3. A method in accordance with claim 1, wherein said automated process flow provides at least one of: (i) an illustration of the relationship between inputs, activities, and outputs of said process; (ii) an illustration of any dependency of said process on other processes; or (iii) an identification of the function or department performing each activity of said process.

4. A method in accordance with claim 1, further comprising:
   providing textual process descriptions which provide a description of at least one of: (i) objectives of each process; triggers corresponding to each process; (ii) inputs to each process; (iii) automated and manual activities identified in each process; (iv) outputs for each process; (v) controls for each process; (vi) performance measures for each process; (vii) applications for each process; (viii) systems for each process; (ix) tools for each process; or (x) related documents for each process.

5. A method in accordance with claim 2, wherein a market development and analysis process stream comprises processes that describe how to undertake changes to a market design.

6. A method in accordance with claim 5, wherein said processes that describe how to undertake changes to a market design include at least one of: a design and administer market changes process, or a manage regulatory approval process.

7. A method in accordance with claim 6, wherein:
   at least one of an issue change management process, a respond to inquiries process, an analyze market operations and performance process, or an implement market design process serves as at least one of an input to or an output from at least one corresponding process of the market development and analysis process stream.

8. A method in accordance with claim 2, wherein a system model process stream comprises processes that build and maintain various power system models that form a foundation for other process streams.

9. A method in accordance with claim 8, wherein said processes that build and maintain the various power system models include at least some of: a register generation or dispatchable load asset process, a register e-dispatch capability process, a register new transmission asset process, a maintain technical asset information process, a deactivate pricing nodes process, a build Energy Management System (EMS) power system model process, an install EMS power system model process, an activate generation asset process, an activate transmission asset process, a register settlements only generation asset process, a register load asset process, a register tie line asset process, or a register interruptible load asset process.

10. A method in accordance with claim 9, wherein at least one of a build FTR model process, a settle the day-ahead markets process, or a settle the real-time markets process serves as at least one of an input to or an output from at least one corresponding process of the system model process stream.

11. A method in accordance with claim 2, wherein a outage scheduling process stream comprises processes that capture and maintain generation and transmission outage information.

12. A method in accordance with claim 11, wherein said processes that capture and maintain generation and transmission outage information include at least some of: a capture generation outage requests process, a capture transmission outage requests process, a maintain outage scheduler process, an evaluate outage requests process, a develop constraints process, or a perform complex studies process.

13. A method in accordance with claim 12, wherein at least one of a perform regional resource adequacy assessment process, a build FTR model process, a maintain transmission planning library process, or a maintain system security process serves as at least one of an input to or an output from at least one corresponding process of the outage scheduling process stream.

14. A method in accordance with claim 2, wherein a FTR/ARR auction process stream comprises processes that accomplish the FTR auction and allocation of the auction revenues.

15. A method in accordance with claim 14, wherein said processes that accomplish the FTR auction and allocation of the auction revenues include at least some of: a build FTR model process, a capture FTR bid data process, a determine qualified upgrade awards process, an operate FTR auction process, an operate secondary FTR market process, or an allocate auction revenue process.

16. A method in accordance with claim 15, wherein at least one of an install Energy Management System (EMS) power system model process, a register security administrator or user process, an evaluate outage requests process, a conduct tariff study process, a settle the day-ahead markets process, or a bill the customer process serves as at least one of an input to or an output from at least one corresponding process of the FTR/ARR auction process stream.

17. A method in accordance with claim 2, wherein a day-ahead market process stream comprises daily processes that lead to the settlement of the day-ahead market.

18. A method in accordance with claim 17, wherein said processes that lead to the settlement of the day-ahead market include at least some of: a capture day-ahead bids and offers process, an extend day-ahead bidding deadline process, a capture day-ahead external transactions process, an extend re-offer period process, a create day-ahead market schedules process, a settle day-ahead markets process, or a capture day-ahead internal bilateral transactions process.

19. A method in accordance with claim 18, wherein at least one of an evaluate offers and bids process, a develop constraints process, a perform reserve adequacy commitment process, or a bill the customer process serves as at least one of an input to or an output from at least one corresponding process of the day-ahead market process stream.

20. A method in accordance with claim 2, wherein a real-time market process stream comprises daily and minute-to-minute processes that lead to settling of real-time markets.

21. A method in accordance with claim 20, wherein said daily and minute-to-minute processes that lead to settling of real-time markets include at least some of: a capture real-time external transactions process, an evaluate real-time external transactions process, a perform day-before check out of real-time external transactions process, a capture real-time bids and offers process, a perform reserve adequacy commitment process, a maintain system security process, a dispatch generation resources process, a dispatch regulation process, a schedule next-hour real-time external transactions process, a curtail real-time external transactions process, a maintain real-time operational data process, an implement emergency operations process, a perform operations administrative tasks process, a capture telemeter data process, a manage compliance process, a monitor resource performance process, a perform operations daily review process, a settle real-time markets process, a capture real-time internal bilateral transactions process, or a capture meter data process.

22. A method in accordance with claim 21, wherein at least one of a mitigate offers and bids process, a create day-ahead market schedules process, a develop constraints process, or a register security administrator or user process serves as at least one of an input to or an output from at least one corresponding process of the real-time market process stream.

23. A method in accordance with claim 2, wherein a billing services process stream comprises processes occurring on a monthly basis to prepare and issue bills to customers.

24. A method in accordance with claim 23, wherein said processes occurring on a monthly basis to prepare and issue bills to customers include at least some of: a capture tariff-related owner data process, a determine tariff rates process, a determine transmission service settlement process, a determine Independent System Operator (ISO) tariff settlement process, a determine Installed Capacity (ICAP) settlement process, a determine monthly FTR settlement process, a determine billing adjustments process, a bill customer process, an update "understanding your bill" job aid process, a transfer funds process, or a manage billing disputes process.

25. A method in accordance with claim 24, wherein at least one of a settle the day-ahead markets process, a settle the real-time markets process, or an allocate auction revenue process serves as at least one of an input to or an output from at least one corresponding process of the billing services process stream.

26. A method in accordance with claim 2, wherein a monitor and mitigate markets process stream comprises processes that monitor market activity and mitigate market effects that would distort competitive outcomes.

27. A method in accordance with claim 26, wherein said processes that monitor market activity and mitigate market effects that would distort competitive outcomes include at least some of: a capture authorities and contact information process, a develop evaluation parameters process, an evaluate offers and bids process, a mitigate offers and bids process, an analyze market operations and performance process, or a produce monitoring and analysis reports process.

28. A method in accordance with claim 27, wherein at least one of a capture day-ahead bids and offers process, a capture day-ahead external transactions process, a create day-ahead market schedules process, a develop constraints process, a capture real-time external transactions process, a capture real-time bids and offers process, a perform reserve adequacy commitment process, a maintain real-time operational data process, a settle the day-ahead markets process, a settle the real-time markets process, a respond to inquiries process, or a design and administer market changes process serves as at least one of an input to or an output from at least one corresponding process of the monitor and mitigate markets process stream.

29. A method in accordance with claim 2, wherein a system planning process stream comprises processes relating to load forecasting and analysis, power supply and reliability, and transmission planning.

30. A method in accordance with claim 29, wherein said processes relating to load forecasting and analysis, power supply and reliability, and transmission planning include at least some of: a perform load forecast assessment process, a maintain transmission planning library process, a perform regional resource adequacy assessment process, a perform economic assessment process, a perform regional and regulatory reporting process, a review proposed system changes process, a perform transmission assessment process, a conduct tariff study process, a develop annual transmission expansion plan process, or a coordinate regional planning process.

31. A method in accordance with claim 30, wherein at least one of an evaluate outage requests process, a produce monitoring and analysis reports process, a manage compliance process, a register new transmission asset process, a register generation or dispatchable load asset process, a perform complex studies process, a register company or customer process, or a determine qualified upgrade awards process serves as at least one of an input to or an output from at least one corresponding process of the system planning process stream.

32. A method in accordance with claim 2, wherein a serving customers process stream comprises continuous processes relating to customer service activities.

33. A method in accordance with claim 32, wherein said continuous processes relating to customer service activities include at least some of: a manage customer relationship process, a communicate with customer process, a register company or customer process, a register security administrator or user process, a train customer process, a respond to inquiries process, and a respond to event process.

* * * * *